United States Patent Office 2,737,400
Patented Mar. 6, 1956

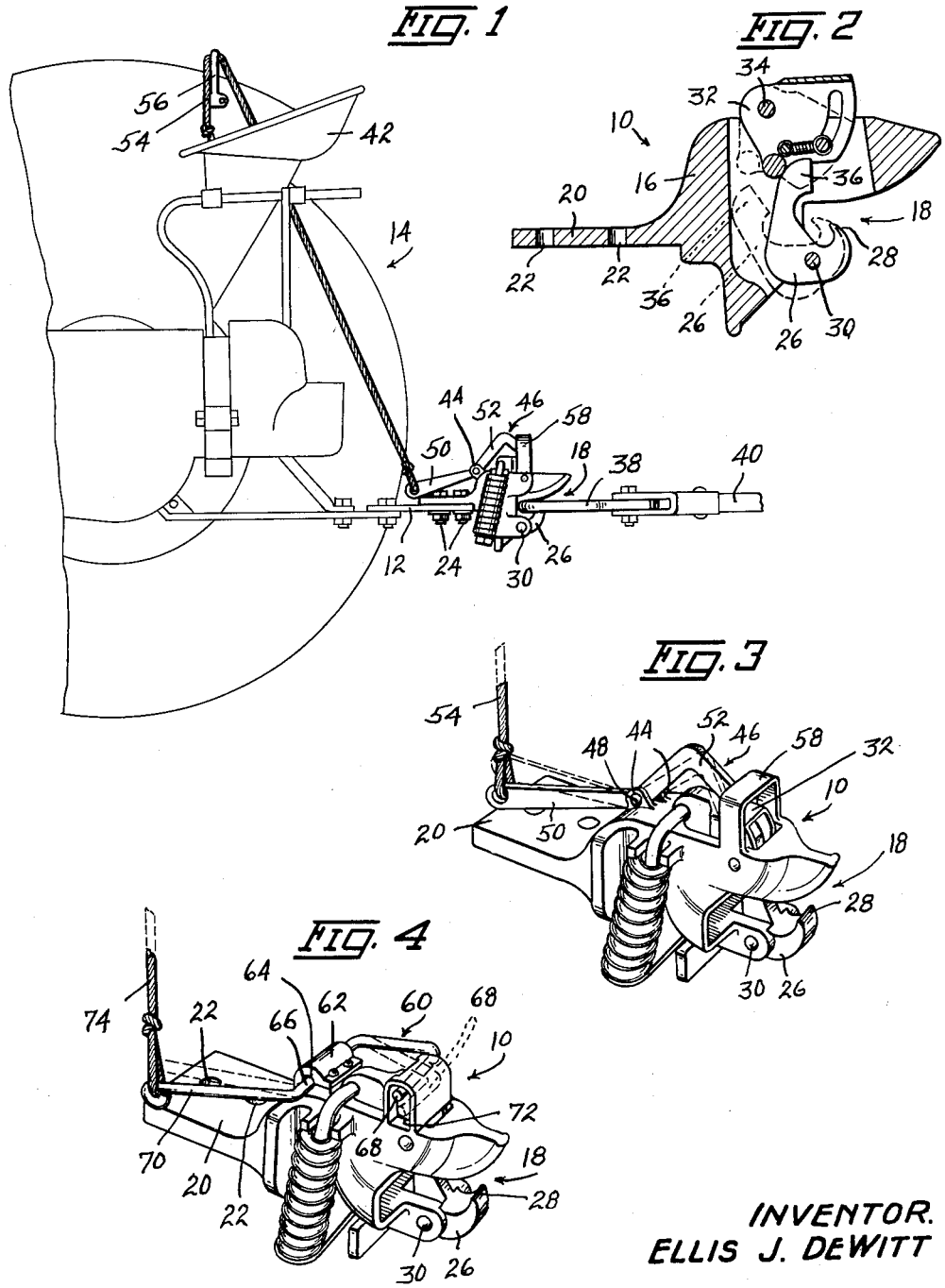

2,737,400

TRIP RELEASE FOR A HITCH

Ellis J. De Witt, Clarion, Iowa

Application March 15, 1955, Serial No. 494,369

2 Claims. (Cl. 280—504)

My invention relates to improvements in trip release mechanisms for hitches such as used on tractors and the like.

Many hitches of this type are constructed to close automatically when engaged by a coupling member on a wagon or implement tongue but cannot be released without the tractor operator dismounting and manually springing the release lever.

It is, therefore, one of the important objects of this invention to provide a manually operated means for releasing the coupling mechanism on a hitch that can be manipulated by the tractor operator without leaving the tractor seat.

A further object of this invention is to provide a trip release means of the above class provided with a suitable guard to prevent accidental release of the coupling mechanism on the hitch.

These and other objects will be apparent to those skilled in the art.

My invention consists in the construction, arrangements, and combination of the various parts of the device, whereby the objects contemplated are attained as hereinafter more fully set forth, specifically pointed out in my claims, and illustrated in the accompanying drawings, in which:

Fig. 1 is a side elevational view of the rear portion of a tractor showing a preferred embodiment of my trip release means mounted to a hitch of common construction, Fig. 2 is an enlarged side view partly in section of a typical hitch to which my invention is applied, Fig. 3 is an enlarged perspective view of a hitch illustrating a preferred embodiment of my release means, and Fig. 4 is an enlarged perspective view of a hitch illustrating a modified structure for my invention.

Referring to the drawings the hitch indicated at 10 in the several drawings is a typical and common form of hitch mechanism for which no invention is claimed. It is of a type commercially available and while used as an attachment to an implement pulled by the tractor, I prefer to mount it to the drawbar 12 of a tractor 14. In general, hitch 10 comprises a body or housing 16 having an open mouth portion 18 disposed at its rear side relative to a front bar 20 containing aligned openings 22 for use in attaching the same to drawbar 12 by means of bolts and nuts 24. A coupling member 26 having a claw-like hook portion 28 is pivotally mounted on a pin 30 to rock forwardly and rearwardly within mouth 18. Member 26 is shown in open position in Fig. 2 where a trip lever or plate 32, pivotally attached to housing 16 by a pin 34, yieldingly holds it in this position by contact with one side of arm 36. This coupling is designed for a contact engagement with the clevis or the like 38 on an implement tongue 40 whereby it moves as shown in dotted lines in Fig. 2 and locks the clevis as shown in Fig. 1. Lever 32 will serve as a stop against the other side of arm 36 since it will only pivot in one direction. By depressing lever 32 it pivots on pin 34 out of the path of arm 36 whereby the member 26 can be easily moved to open position. As pointed out above, no invention is claimed for such hitch per se and it has been described generally merely to illustrate the type of depressible trip release lever used with such devices. Such levers usually require manipulation at the point of the hitch and the object of this invention is to disclose means for tripping them from a point adjacent the driver's seat 42 on the tractor 14.

With reference now to Figs. 1 and 3 I have placed a pair of upstanding spaced bearing ears 44 on the housing 16 and toward the direction of the tractor drawbar 14. A trip member 46 which may be in the form of a rod, bar or the like is pivotally secured between ears 44 by a pin 48 and is formed with the lever arm 50 extending from pin 48 toward the tractor and the head portion 52 disposed for engagement with the top of trip lever 32 on the hitch 10. For this purpose, head 52 is shaped like an inverted V to produce a direct downward force against lever 32 as lever arm 50 is raised by a flexible member such as a cord or cable 54 attached to its outer end and extending to a suitable bracket 56 on the tractor frame near the seat 42. The length and weight of lever portion 50 will return trip member 46 to inoperative position when cord 54 is released. I also provide an arch-like guard 58 on housing 16 over lever 32 so that it cannot be accidentally tripped by stepping on it, for example, and head 52 of release 46 is positioned intermediate this guard and lever 32.

A variation in shape of member 46 though not in principle is illustrated by trip member 60 in Fig. 4. Here I have used in place of ears 44 a bearing member 62 having a bore 64 perpendicular to the direction of movement of the tractor. Member 60 is formed of rod material with a U-shaped head having the portions or arms 66 and 68 with a lever handle 70 integral with arm 66 and extending at an angle thereto away from the U opening. Arm 66 is rotatably journalled in bearing 62 with arm 68 disposed for depressing lever 32 the same as member 52 in Fig. 3. Arm 68 may be wholly within bracket 58 or may move in a slot 72 provided therein as shown. Cord 74 attaches to the outer end of lever 70 and is manipulated in the same manner as cord 54.

It is submitted that the invention shown and described is aptly suited to achieve the purposes intended and is characterized by a combination of highly useful and mutually cooperating elements that combine their respective and proportionate functions in accomplishing the objects sought to be obtained.

Some changes may be made in the construction and arrangement of my trip release for a hitch without departing from the real spirit and purpose of my invention, and it is my intention to cover by my claims, any modified forms of structure or use of mechanical equivalents which may be reasonably included within their scope.

I claim:

1. In combination with a hitch of the class having a body member containing coupling means and a manually movable member in said body member for releasing said coupling means, a trip member for actuating said movable member, comprising, a bearing member on said body member, a trip bar formed with a U-shaped head portion and a lever member extending substantially perpendicularly from one side of the head portion, one side of said U-shaped head pivotally disposed in said bearing member and the other side positioned for engagement with said movable member, and a flexible member secured to one end of said lever portion and designed to be manually pulled upwardly for rocking said trip bar in said bearing member.

2. In combination with a hitch of the class having a body member containing coupling means and a manually movable member in said body member for releasing said coupling means, a trip member for actuating said movable member, comprising, a bearing member on said body member, a trip bar formed with a U-shaped head portion and a lever member extending substantially perpendicularly from one side of the head portion, one side of said U-shaped head pivotally disposed in said bearing member and the other side positioned for engagement with said movable member, a flexible member secured to one end of said lever portion and designed to be manually pulled upwardly for rocking said trip bar in said bearing member, and a guard member on said body member extending over said movable member and over that part of said head portion which engages said movable member.

References Cited in the file of this patent

UNITED STATES PATENTS

| | | |
|---|---|---|
| 2,124,839 | Weiss | July 26, 1938 |
| 2,269,806 | Brecka | Jan. 13, 1942 |
| 2,332,155 | Lobelle et al. | Oct. 19, 1943 |
| 2,467,816 | Cutsinger et al. | Apr. 19, 1949 |
| 2,547,313 | Gosser | Apr. 3, 1951 |